INVENTOR.
Kurt A. Riedel
BY
Cyril M. Hajewski
Attorney

United States Patent Office 3,323,419
Patented June 6, 1967

3,323,419
SPINDLE CHUCK DEVICE
Kurt A. Riedel, Pompano Beach, Fla., assignor to Kearney & Trecker Corporation, West Allis, Wis., a corporation of Wisconsin
Original application Aug. 20, 1963, Ser. No. 303,280, now Patent No. 3,292,235, dated Dec. 20, 1966. Divided and this application Aug. 30, 1966, Ser. No. 576,139
11 Claims. (Cl. 90—11)

This patent application constitutes a division of my copending U.S. Patent application, Ser. No. 303,280, filed Aug. 20, 1963, and now Patent No. 3,292,235, for a "Machine Tool With a Combined Tool Storage and Changing Mechanism."

The invention relates generally to automatic machine tools incorporating chuck means providing for rapid engagement and release of a tool in a spindle of the machine tool.

More particularly, the present invention relates to spindle chucks wherein a collet is utilized to grip a tool for locking the tool to the spindle.

Collet type chucking devices utilized in many machine tool spindles for locking the tool in the spindle are dependent solely on the frictional gripping force that is exerted by the resilient fingers or gripping elements of the collet with the periphery of the shank of the tool. However, in modern machine tools, this type of tool chuck is not adequate to securely lock a tool in the spindle. In modern machine tools, the range of spindle speeds has increased; the horsepower for driving the spindle has increased; and, the materials on which work is to be performed is more difficult to machine. These changes have made it necessary to provide machine spindles with tool chucking devices which not only prevent rotation of the tool in the spindle but also prevent the tool from "pulling-out" during a machining operation. In addition, the tool chucking device must be fast acting, both in its locking and in its releasing operation. The chucking device must also be capable of being automatically operated so that it is suitable for use with automatic tool changing machine tools.

It is therefore an object of the present invention to provide an improved means for automatically locking and releasing a tool in a machine tool spindle.

Another object of the present invention is to provide a simple and effective mechanism for locking tools in driving engagement in a rotatable spindle of a machine tool.

According to this invention, improved spindle chucking device generally comprises a tool locking apparatus associated with a hollow rotatable spindle of a machine tool. The locking device includes a frusto-conical cam member which is actuated axially to engage complementary sloping inner side surfaces of radially displaceable tool grippers carried internally in the hollow spindle rearwardly of the tool. Axial movement of the frusto-conical cam member in one direction serves to displace the radially movable tool grippers outwardly. The tool grippers in being moved radially outwardly engage flanges formed in axial disposed finger elements in the axial shank end of the tool. The tool grippers, in being moved radially outwardly, are also caused to move axially rearwardly of a tool. The combined outward radial movement and inward or rearward axial movement of the tool grips effects the engagement of the tool grips with the tool, moving the tool axially inwardly in proper seated engagement in the spindle tool socket and simultaneously locks or holds the tool from being pulled or displaced axially outwardly of the spindle tool socket. On the other hand, movement of the frusto-conical cam member in the opposite direction serves to move the conical surface of the cam member out of forceful engagement with the tool grippers thereby releasing the tool grippers from axial force applying engagement with the tool. In addition, the frusto-conical cam member will be moved into abutting engagement with axial transverse shoulders formed on the tool grippers. The engagement serves to positively move the tool grippers axially towards the open end of the tool spindle. In this movement, the tool grippers engage radially inwardly inclined surfaces formed in a guide block so that they move radially towards the axis of the spindle as they move axially outwardly. The combined movements serve to move the outwardly disposed flanges of the finger elements free and clear of the internally formed circular flange forward in the axial end of the tool shank thereby releasing the tool for withdrawal from the spindle tool socket. Actuation of the frusto-conical cam member in a tool locking or releasing movement may be effected hydraulically but is practically well suited for mechanical operation.

The foregoing and other objects of this invention, which will become more fully apparent from the following detailed description, may be achieved by means of the exemplifying apparatus depicted in and set forth in this specification in connection with the accompanying drawings, in which.

Figure 1:
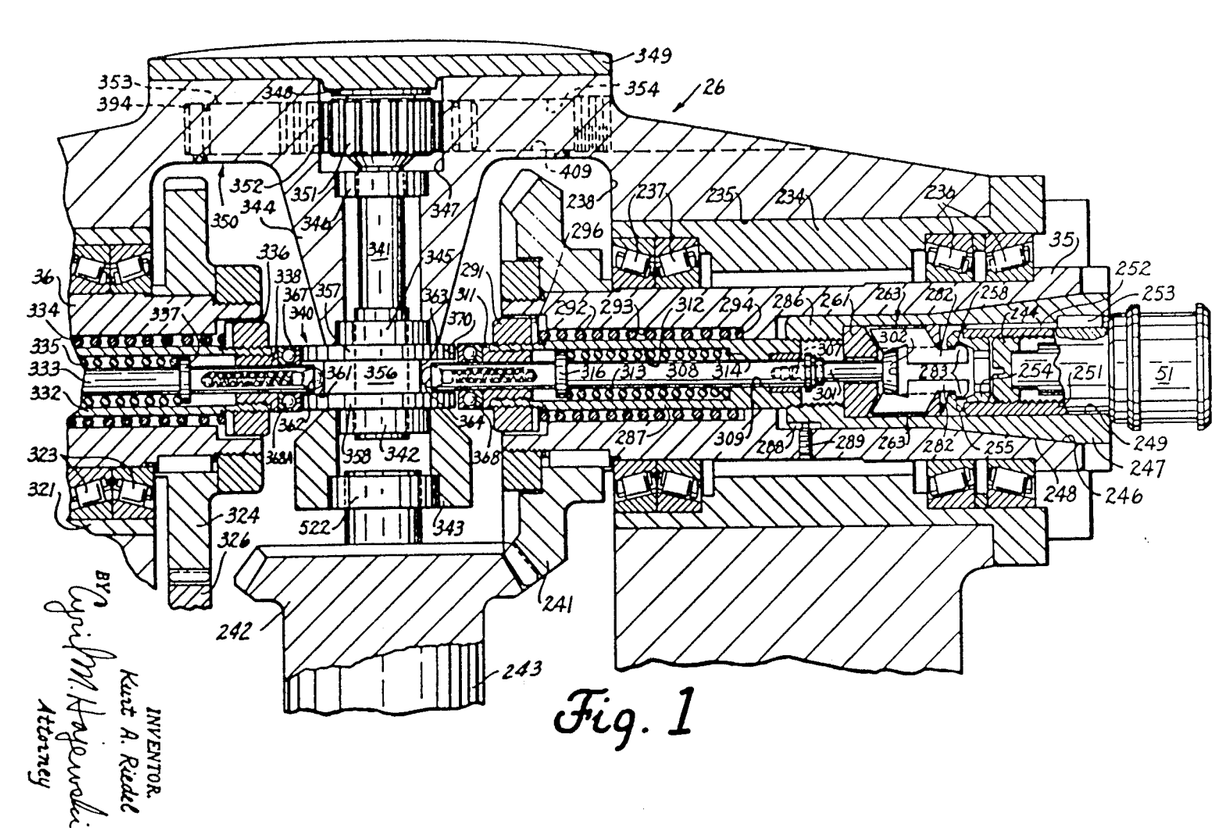
FIGURE 1 is an enlarged fragmentary detail view substantially in vertical section taken through the spindle head and showing details of the novel tool locking and clamping mechanism of one of the spindles, and the actuating mechanism for effecting the simultaneous operation of the tool locking and clamping mechanisms of both spindles.

The spindle 35 is journaled in a sleeve 234 that is secured within a radial opening 235 formed in the spindle head 26, being rotatably supported at its forward end by a pair of bearings 236 and at its readward end by a pair of bearings 237. A spindle driving bevel gear 241 is keyed to the spindle 35 at its rearward end adjacent the bearings 237 and is disposed within a compartment 238 formed in the spindle head. The spindle head gear 241 is connected to be driven by a bevel gear 242 also located within the compartment 238. The bevel gear 242 is integrally formed on a power shaft that is disposed to extend inwardly into the supporting column [not shown] of the machine tool. The shaft 243 is selectively connectible to be driven by a suitable power means, such as motor [not shown], of the machine tool.

The forward end of the spindle 35 is provided with a tapered opening 246 for receiving a collet 247 that includes a complementary tapered portion 248 for engagement with the tapered opening 246 of the spindle 35. The collet 247 is provided with a concentric bore 249 for receiving a cylindrical shank 251 of a toolholder 51 that is provided with a tool, the shank thereof being shown in abutting engagement with an axial adjusting plug 244 that is threadedly engaged in the threaded axial bore formed in the toolholder 51. Hereinafter, the term "tool" will be used in the description and will apply to a tool structure per se, or a tool and toolholder combination. The collet 247 is arranged so that it may be compressed about the cylindrical shank 251, in a well-known manner, for clamping the tool in the spindle 35. Compression of the collet 247 for locking a tool therein is achieved by drawing the collet rearwardly to move it into the tapered opening 246 of the spindle 35 so that the complementary tapered portions operate to compress the collet 247 as it is drawn rearwardly. To release the tool, of course, the collet 247 is moved forwardly a slight amount within the tapered portion 246 to relieve the pressure upon the cylindrical shank 251 of the tool for releasing the tool and permitting the tool to be withdrawn from the spindle. However, it has been found that during work operations with some types of cutting tools, axial thrust forces are developed which act upon the tool and tend to pull the tool out of the operating spindle. To prevent such action from occurring, and also to actuate the collet in a gripping and releasing action, a novel automatic tool holding and locking apparatus has been provided, which is operative to effect movement of the collet 247 in a tool clamping or releasing action and also to lock the tool within the collet to positively hold the tool from moving axially outwardly of the spindle.

Figure 2:
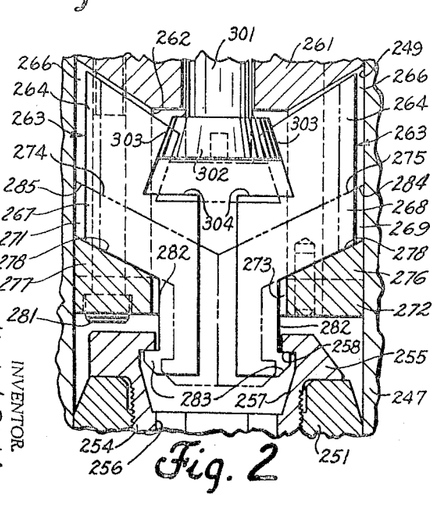
FIG. 2 is a fragmentary view in longitudinal section through a spindle showing the apparatus for effecting axial locking of a tool in a spindle.
Figures 3, 4, 6, 7:
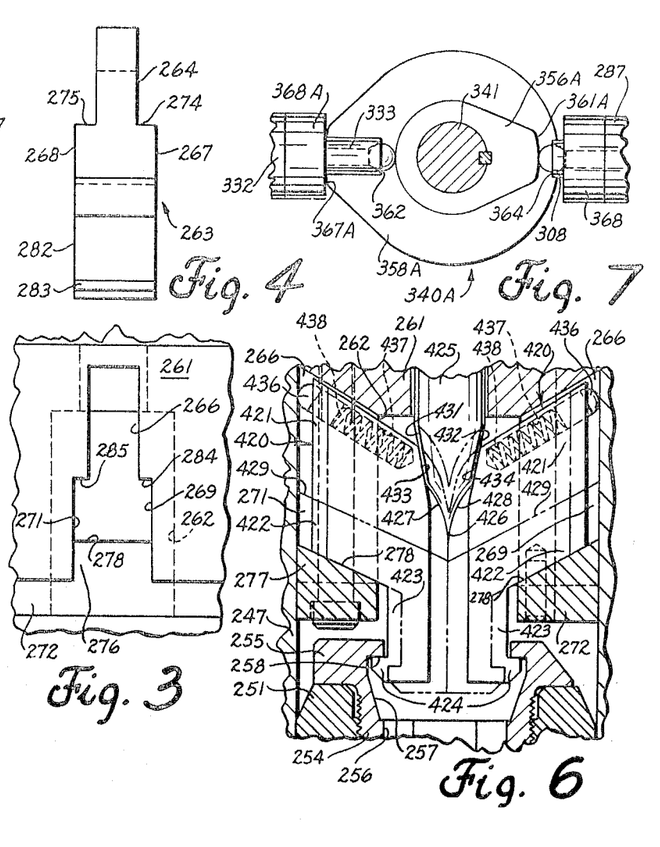
FIG. 3 is a fragmentary detail view in side elevation of the gripping member supporting block depicted in FIG. 2 showing the guideway construction therein.
FIG. 4 is an enlarged detail view in elevation showing the construction of a gripping member illustrated in FIG. 2.
FIG. 6 is an enlarged view similar to FIG. 2 showing a modified arrangement of the drawbar and gripping members.
FIG. 7 is an enlarged plan view illustrating the actuating cam member arranged for operation with the gripping members shown in FIG. 6; and, FIG. 8 is a diagrammatic view of a hydraulic and electrical wiring diagram illustrating the control circuit for controlling the operation of the spindle collet and gripping member actuator in a tool clamping and releasing operation.

To this end, as shown generally in FIG. 1 and in detail in FIG. 2, the cylindrical shank 251 of the tool is provided with an internal thread for threadedly receiving an externally threaded coupling 254 having a radially extending flange head portion 255. The coupling 254 is provided with a concentric bore 256, a portion of which is enlarged to form a chamber 257, as shown in FIG. 2. By enlarging the bore 256 to form the chamber 257, an inwardly facing shoulder 258 is provided which serves as a gripping surface for the tool locking means. The locking means, in general, comprise a cylindrical guide block 261 having a concentric bore 262. Two radially and axially movable tool gripping members 263 are supported in the guide block 261 along inclined radial paths of travel so that they move towards and away from the axis of the collet 247, as well as axially. The gripping members 263, as depicted in FIGS. 2 and 4, are constructed with vertical guides 264 which are disposed to move within vertical slots 266, shown in FIGS. 2 and 3, that are formed in the guide block 261. The slots 266 are formed diametrically opposite to each other and extend inwardly to the bore 262. The vertical guides 264 cooperate with the slots 266 to maintain the guide members 263 in upright position as they move radially and axially. As clearly illustrated in FIG. 4, each gripping member 263 is provided with a pair of laterally extending angularly inclined guides 267 and 268, which present upper inclined slide surfaces 274 and 275 respectively. The guides 267 and 268 are disposed to move within complementary guideways 269 and 271 formed at the lower end of each vertical slot 266, as depicted in FIG. 3. As shown in FIGS. 2 and 3, the guideways 269 and 271 present downwardly facing inclined slide surfaces 284 and 285, which are adapted to be engaged by the inclined slide surfaces 274 and 275 of the guides 267 and 268 upon the application of an axial upwardly acting force to the gripping members. When such force is applied to the gripping members, the inclined surfaces 274 and 275 of the guides 267 and 268 of each gripping member slide along the inclined faces 284 and 285 of the guideways 269 and 271. As a result, the gripping member 263 will move upwardly as well as radially outwardly, being maintained in vertical position by the vertical guides 264 moving in the slots 266.

A circular end cap 272, having an axial opening 273, is provided for the end of the guide block 261 which is adjacent the collet 247. Two axially extending projections 276 and 277, having inclined machined surfaces 278 formed on their inner ends, are parallel to the inclined surfaces 274 and 275 and cooperate therewith for establishing an inclined path of travel for the vertical guides 264 to produce the desired movement of the gripping members 263. The guide block 261, end cap 272, and the associated gripping members, are operably retained in the bore 249 of the collet 247 by means of a plurality of screws 281, one of which is shown. These screws 281 are adapted to extend through registering openings formed in the end cap 272 and guide block 261 into threaded engagement in suitable threaded openings provided in the inner end of the collet 247. Axially depending arm 282 of the gripping members 263 extend outwardly of the guide block 261 through the axial opening 273 of the end cap 272 and into the chamber 257 of the coupling 254. The depending arms 282 are operable to effect a locking of the tool in the collet 247. To this end, the extreme lower end of each arm 282 is formed with an outwardly extending flange 283 which is adapted to positively engage with the inwardly facing gripping surface of the annular shoulder 258 of the coupling 254. This locking engagement is effected by the rearward and radial outward movement of the gripping members 263. Such engagement of the gripping members 263 with the tool will positively lock the tool in the collet 247.

In FIG. 2, the gripping members 263 are illustrated by the solid lines in their actuated positions in which they operate to lock the tool within the collet 247. As previously described, the gripping members 263 are movable inwardly and downwardly within the guide block 261 into the position depicted by the broken lines in FIG. 2. In this position, the adjacent vertical faces of the depending arms 282 abut and the flange 283 of each arm is moved out of gripping engagement with the gripping surface of the shoulder 258 of the coupling 254 to release the tool that is disposed within the collet 247.

The collet 247 includes a rearwardly extending cylindrical portion 286 which is provided with an internal thread at its rearmost end for engaging the forward threaded end of a drawbar 287, as shown in FIG. 1. In addition to being in threaded engagement with the drawbar 287, the cylindrical portion 286 of the collet 247 is provided with a slot 288 which extends parallel to the axis of the collet and is engaged by the end of a set screw 289. The set screw 289 is threaded into the wall of the spindle 35 so that its end extends into the slot 288 and operates to prevent the collet from rotating relative to the drawbar 287 so that it will not lose its threaded connection therewith, while permitting the collet 247 to have limited axial movement relative to the spindle 35.

The drawbar 287 is disposed within the longitudinal bore of the spindle 35 and serves to transmit the force which move the collet 247 axially for either applying a collet clamping force to the tool or releasing the clamping force applied by the collet to the tool. To this end, the drawbar 287 extends rearwardly of the collet 247 beyond the bevel gear 241, and its rear extremity is provided with a thread for threadedly receiving a collar 291. The drawbar 287 is yieldably urged rearwardly of the spindle 35 by a spring 292 mounted about the drawbar and housed within a counterbore 293 formed in the spindle 35. One end of the spring bears against a shoulder 294 formed by the bore of the spindle and the counterbore 293. The opposite end of the spring 292 bears against the collar 291 through a thrust washer 296, the spring 292 being under compression so that it normally urges the collar 291 and the drawbar 287, to which the collar is attached, rearwardly of the spindle. This force in the rearward direction applied by the spring 292 to the collet 247 through the drawbar 287 serves to draw the collet 247 tightly into the tapered portion 246 of the spindle to cause the collet to contract for clamping a tool therein.

Actuation of the gripping members 263 in a tool locking and releasing action is accomplished by means of an actuating rod 301 having a frusto-conical head portion 302 disposed within the bore 262 of the guide block 261, as shown in FIG. 1. Within the bore 262, the conical surface of the head portion 302 is adapted to slidably engage inwardly inclined surfaces 303, FIG. 2, formed on the inner faces of the vertical guide portions 264 of the gripping members 263. The angular inclination of the surfaces 303 is complementary to the angle of the taper of the peripheral surface of the head 302. In forming the surfaces 303 in each of the gripping members 263, a horizontal surface or shoulder 304 is formed which serves as an abutting surface against which the adjacent axial end face of the frusto-conical head portion 302 will engage when a downwardly acting force is applied to the rod 301. When the actuating rod 301 is moved axially rightwardly, as viewed in FIG. 1, or downwardly, as viewed in FIG. 2, the head portion 302 thereof is moved into engagement with the horizontal surfaces 304 of the gripping members 263. This initial downward movement of the head 302 into engagement with the horizontal surfaces 304 of the gripping members 263 will position the head 302 so that its peripheral surface is moved out of engagement with the inclined surfaces 303 of the gripping members 263, as illustrated by the broken lines in FIG. 2. As the applied force continues to act on the rod 301, the head will transmit this force to the horizontal surfaces 304 of the gripping members urging them axially downwardly. However, the lateral guides 267 and 268 of the gripping members will slide in the angularly disposed guideways 269 and 271 of the guide block causing the gripping members 263 to move inwardly towards the axis of the spindle as they move axially downwardly. This movement of the gripping members 263 continues until the adjacent vertical surfaces of the arm portions 282 of the gripping members 263 abut, as indicated by the broken lines in FIG. 2. The simultaneous downward and inward movement of the gripping members 263 into abutting engagement will move the flange 283 of each arm 282 out of engagement with the gripping surface of the circular shoulder 258 of the tool and retract the flanges 283 radially inwardly releasing the tool.

In a tool locking action, a force in the opposite direction applied to the rod 301 will cause the rod 301 and its associated head portion 302 to move axially upwardly, as viewed in FIG. 2. Thereupon, the peripheral surface of the head portion 302 of the rod 301 engages the inclined surfaces 303 of the gripping members 263. This action causes the gripping members 263 to move outwardly away from each other and also to move upwardly, as viewed in FIG. 2. Thereupon, the flanges 283 of the arms 282 forcefully engage the gripping surface of the circular shoulder 258 of the tool coupling 254 thereby applying an axial rearwardly acting locking force to the tool in the collet 247.

The rod 301 extends rearwardly through an axial opening formed in the head of the guide block 261 and includes a threaded reduced portion 307 which is threadedly engaged in a threaded bore provided in the forward extending end of a second drawbar 308. The drawbar 308 is disposed within a longitudinal concentric bore 309 of the collet drawbar 287 and serves to transmit the force which moves the actuating rod 301 for opening the gripping members 263 for releasing and locking a tool in the collet 247. To this end, the drawbar 308 extends rearwardly of the collet 247 beyond the rearwardly extending end of the collet drawbar 287 and through a retainer 311 that is threadedly engaged in a counterbore 312 of the collet drawbar 287. The drawbar 308 is yieldably urged rearwardly of the spindle 35 by a spring 313 that is disposed about the drawbar 308 and located within the counterbore 312 of the collet drawbar 287. One end of the spring 313 bears against a shoulder 314 formed by the counterbore 312 in the collet drawbar 287. The opposite end of the spring 313 bears against a radially extending collar 316 integrally formed with the drawbar 308, the arrangement being such that the drawbar 308 is normally urged rearwardly of the spindle. This force in a rearward direction applied by the spring 313 to the actuating rod 301 through the drawbar 308 serves to move the gripping members 263 rearwardly and outwardly through the operation of the frusto-conical head portion 302 of the actuating rod 301 to positively lock a tool in the collet 247 against axial outward movement.

FIG. 6 illustrates an alternate arrangement of the novel tool gripping members in which a modified arrangement for actuating the gripping members into tool engagement and releasing action is provided. In this embodiment, a pair of gripping members 420, having the same general configuration as the gripping members 263, are supported for guided movement in the pair of guideways 266 formed in the guide block 261. Each gripping member 420 is provided with a vertical guide 421 disposed within the vertical guideways 266 of the block 261 and a pair of laterally extending angularly inclined guides 422, only one of which is shown for each gripping member. These lateral guides are disposed within the angular lateral guideways 269 and 271 of the block 261 and present upper inclined slide surfaces 429 that cooperate with the downwardly facing inclined slide surfaces 284 and 285 of the guideways 269 anr 271 so that the gripping members move radially outwardly or inwardly towards or away from the axis of the collet 247 as they move axially upwardly or downwardly. Each gripping member has an axially depending arm 423 formed at its face end with a laterally extending flange 424 which is adapted to engage with the gripping surface of the circular shoulder 258 of the coupling 254 that is threadedly connected in the cylindrical shank 251 of a tool. However, actuation of the gripping members 420 into tool gripping engagement, as shown by the full lines in FIG. 6, from a released position, as indicated by the broken lines in FIG. 6, is accomplished by means of a rod 425. At its forward end, the rod 425 is provided with a chisel edge 426 having concave side surfaces 427 and 428 which intersect angular pressure surfaces 431 and 432 thereon, respectively. The angular pressure surfaces 431 and 432 are constructed and arranged to engage complementary angular surfaces 433 and 434 formed on adjacent inner ends of the vertical guides 421 of each of the gripping members. The gripping members 420 are each urged inwardly towards the axis of the collet 247 into abutting relationship, as indicated by the broken lines in FIG. 6, by a plunger 436 slidably disposed within a bore 437 formed in the vertical guide portion 421 of each gripping member. The plunger 436 is urged outwardly of the bore by means of a spring 438 so that the outward end of the plunger engages against the surface of the collet bore in which the guide block 261 is disposed. With the plunger 436 in engagement with the surface of the bore, the force of the spring 438 will act on the gripping member 420 urging it inwardly towards the axis of the collet. As the gripping member 420 moves inwardly by the action of the spring 438, it is guided in such movement by the lateral guide 422 which is slidable in the guideways 269 and 271 of the guide block 261. As the gripping members 420 move inwardly towards the axis of the collet 247 they also move downwardly by operation of the inclined slide surfaces 429 of the inclined guides 422 cooperating with the inclined slide surfaces 284 and 285 of the block 261, as well as by the cooperation of the parallel inclined surfaces 278 of the end cap 272, which slidably engages the under surface of the gripping members 420. As the gripping members 420 move inwardly and downwardly, the flange portions 424 of each arm 423 also moves downwardly and inwardly out of engagement with the gripping surface of the circular shoulder 258 of the coupling 254 releasing the tool. The position of the gripping members 420, when in tool releasing position, is indicated by the broken lines in FIG. 6.

When it is desired to move the gripping members 420 in a tool locking action, a force is applied to the rod 425 to move it downwardly from its retracted position, indicated by the broken lines in FIG. 6. As the rod moves downwardly, the chisel edge 426 of the rod 425 enters into the space formed by the divergent surfaces 433 and 434 of the gripping members 420 so that the adjacent concave side surfaces 427 and 428 adjacent the chisel edge 426 of the rod 425 will engage the angular outwardly inclined surfaces 433 and 434 of the gripping members 420. This initial entrance of the chisel edge of the rod 425 between the gripping members 420 will serve to start the gripping members moving outwardly and upwardly and provide clearance for the entry of the inclined pressure surfaces 431 and 432 into engagement with the surfaces 433 and 434 of the gripping members. As the rod 425 continues to move downwardly, a greater area of the pressure surfaces 431 and 432 is gradually engaged with a greater area of the surfaces 433 and 434 until such time as the flanges 424 of the arm portion 423 of the gripping members 420 firmly engage the gripping surface of the circular shoulder 258 of the coupling 254 to effect positive axial locking of the tool within the spindle 35.

The rod 425 extends rearwardly through the axial opening formed in the head of the guide block 261 and is adapted to be threadedly connected to the forwardly extending end of the drawbar 308 in the same manner as previously described in conjunction with the rod 301. However, when the drawbar 308 is urged leftwardly, as viewed in FIG. 1, by operation of the spring 313, it actuates the rod 425 to effect operation of the gripping member 420 in a tool releasing operation rather than a tool clamping, as is the case when the drawbar is associated with the rod 301.

As previously mentioned, the spindle 36 is identical in construction and operation to the spindle 35 and is provided with exactly the same arrangement for contracting and releasing its associated collet and for locking a tool in the collet against axial outward movement. Thus, as shown in FIG. 1, the spindle 36 is journaled in a sleeve 321, being rotatably supported therein at its forward end by a pair of bearings [not shown] and at its rearward end by a pair of bearings 323. A spur gear 324 is keyed to the spindle 36 at its rearward end adjacent the bearings 323. As shown in FIG. 1, the spur gear 324 is disposed in meshing engagement with a power transfer gear 326 which is selectively connectible to be driven by the machine tool motors [not shown].

The forward end of the spindle 36 is provided with a tapered socket [not shown] for receiving a collet [not shown]. The collet [not shown], associated with the spindle 36, is adapted to be moved axially by a collet drawbar 332, shown in FIG. 1, which is identical to the drawbar 287 associated with the collet 247 of the spindle 35. Concentrically arranged in the collet drawbar 332 is a tool gripping drawbar 333 that is operable in the same manner and for the same purpose as the drawbar 308 associated with the spindle 35. Both of the drawbars 332 and 333 are yieldably urged rearwardly of the spindle 36 by means of associated springs 334 and 335 which are arranged for operation in the identical manner as the springs 292 and 313 that are associated with the drawbars 287 and 308 of the spindle 35. Thus, the spring 334 acts on a collar 336 that is threadedly connected to the extreme inner end of the drawbar 332, to urge the drawbar 332 rearwardly of the spindle. In like manner, the drawbar 333 is urged rearwardly by its associated spring 335 acting on a radially extending collar 337 that is integrally formed with the drawbar 333 through a retainer 338 that is threadedly connected to the drawbar 332. The force applied by the spring 334 to the drawbar 332 operates to draw the collet [not shown] within the spindle 36 to compress it and thereby clamp the tool [not shown] in the collet [not shown]. On the other hand, the force applied by the spring 335 to the drawbar 333 operates to move the gripping members 263 associated with the spindle 36 into axial locking engagement with the tool in the spindle.

For the purpose of this description, it will be assumed that the spindle head 26 is supported on the machine tool for indexing movement about a horizontal axis for alternately positioning a spindle into a downwardly facing work operating position 74 and simultaneously therewith moving the opposite spindle with the previously used tool into an upwardly facing tool change position 75 for a tool change operation. The work operating position 74 and the tool change position 75 are spaced 180° apart so that the spindles 35 and 36 will be in one or the other of the positions 74 or 75, depending upon the particular indexing cycle. Under these conditions, the tool carried by the spindle, which is located in the tool change position 75, must be released so that it may be removed from the spindle and a new tool inserted therein. On the other hand, the tool in the spindle, which is in the operating position 74, must be locked in the operating spindle for performing a work operation. The release of the tool associated with the spindle being moved into the tool change position 75 and the locking of the tool in the spindle that is being moved into the work operating position 74 is accomplished simultaneously and at the time that the spindle head 26 has been rotated 90° from the position wherein the spindles 35 and 36 are located in a vertical plane. When the spindle head 26 has been rotated 90°, both spindles 35 and 36 will be disposed with their axes in a horizontal plane. When the spindle with the previously used tool is moved from the downwardly facing work operating position 74 into a horizontal plane, the clamping and locking mechanism associated with the particular spindle will be actuated to release the tool. Since the spindle, and therefore the tool therein, is in a horizontal plane, the released tool cannot fall out of the spindle. On the other hand, when the spindle with a new tool therein is moved from the upwardly facing tool change position 75 into a horizontal plane, the clamping and locking mechanism associated with that spindle will be actuated to clamp and lock the new tool in the spindle. Thus, when the spindle with the new tool therein is in a horizontal plane, the tool is clamped and locked in the spindle and, therefore, cannot fall out of the spindle.

Figure 5:
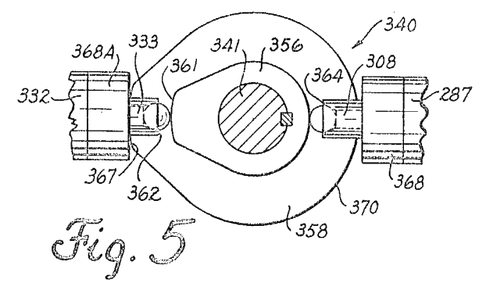
FIG. 5 is an enlarged plan view illustrating the actuating cam member shown in FIG. 1 for effecting the simultaneous operation of the gripping members associated with each spindle.

To effect the simultaneous opposite operation of the collets and gripping members associated with the spindles 35 and 36, a cam member 340, shown in FIGS. 1 and 5, is keyed to a shaft 341 for rotation therewith. The shaft 341 is supported in the spindle head 26 with its axis coinciding with the axis about which the spindle head 26 rotates in an indexing movement. As shown in FIG. 1, the shaft 341 has its inner end rotatably supported in a bearing 342 carried by a transversely extending web 343 integrally formed with the spindle head. The shaft 341 extends through an axial opening formed in an inwardly extending projection 344, being journaled therein by a pair of bearings 345 and 346. The shaft 341 extends into a counterbore 347 and has its extreme outer end journaled in a bearing 348 carried in a cover plate 349 of the spindle head. A gear 351 is keyed to the shaft 341 and is in meshing engagement with a gear rack 352 formed on a piston 353 reciprocally disposed in a cylinder 354 of an actuator 350 for imparting rotational movement to the shaft 341. The cam member 340, its associated drive shaft 341, and the piston 353, all rotate bodily with the spindle head 26, and the cam member 340 is also rotatable relative to the spindle head 26 by operation of the piston 353, and is therefore rotatable relative to the spindles 35 and 36.

The cam member 340, as shown in FIGS. 1 and 5, is formed with a center cam 356 and a pair of large cams 357 and 358 which are disposed on either side of the center cam 356. The two cams 357 and 358 are identical and function unitarily. The arrangement of the cam member 340 is best shown in FIG. 5, where only the center cam 356 and one large cam 358 are illustrated since the other large cam 357 is identical to the cam 358. The center cam 356 is generally of circular configuration having a lobe 361 which is constructed and arranged to engage the extending end of one or the other of the drawbars 308 or 333, depending upon the position of the cam member 340. The cam member 340 is illustrated in FIG. 1 with the lobe 361 of the center cam 356 in engagement with the extending end 362 of the drawbar 333 associated with the spindle 36. With the cam member 340 positioned, as shown in FIG. 1, the lobe 361 of the cam 356 engages the end 362 of the drawbar 333 to move the drawbar leftwardly against the force of its associated spring 335, to actuate the gripping members 263 associated with the spindle 36 to release the tool in the spindle. On the other hand, the opposite side of the cam 356 does not engage the end of the drawbar 308 so that the latter is under the influence of its cooperating spring 313 to operate its associated gripping members 316 for locking the tool in the spindle 35.

The outer cams 357 and 358 of the cam member 340 are generally of circular configuration and have a lobe 367 for alternately actuating the two drawbars 332 and 287. In FIGS. 1 and 5, the cam member 340 is illustrated in position so that the two lobes 367 of the two cams 357 and 358 simultaneously engage a thrust bearing 368A for applying an axial force to the end of the collet drawbar 332. Such actuation of the drawbar 332 is against the force of the collet drawbar spring 334 to effect the necessary slight outward movement of the collet associated with the spindle 36 for releasing the tool in the collet. With the cam member 340 positioned, as shown in FIG. 1, wherein the lobes 367 of the outer cams 357 and 358 are simultaneously engaged with the bearing 368A that cooperates with the drawbar 332, the configuration of each cam 357 and 358 is such that a surface 370 of each of the cams 357 and 358 opposite the lobes 367 will not engage an anti-friction bearing 368 associated with the extending end of the collet drawbar 287 that operates with the spindle 35. Thus, the spring 292 will continue to urge the drawbar 287 leftwardly, as viewed in FIGS. 1 and 5, for drawing the collet 251 inwardly into the socket 246 of the spindle 35 to actuate the collet for securing the associated tool therein.

For the purpose of describing the operation of the power driven cam member 340 for effecting the simultaneous releasing and locking of the tools respectively associated with the spindles 35 and 36, its opertaion will be described in conjunction with an indexing movement of the spindle head. It will be assumed that the cam member 340 is positioned, as shown in FIGS. 1 and 5, so that the lobe 361 of the cam 356 is in engagement with the end of the drawbar 333 associated with the gripping members carried by the spindle 36; while the lobes 367 of the cams 357 and 358 are in engagement with the end of the drawbar 332 associated with the collet (not shown) of the spindle 36. As the spindle head 26 rotates in an indexing positioning movement, the cam member 340, cam member drive shaft 341, and actuating piston 353, will rotate bodily with the spindle head 26 so that the cam member 340 is retained in the same position relative to the sprindles 35 and 36. Thus, when indexing of the spindle head 26 is initiated, the tool [not shown] associated with the spindle 36 is released. On the other hand, the tool 51, associated with the spindle 35, is locked and clamped in the spindle 35 by its associated collet 247. When the spindle head 26 has been rotated 90°, both spindles will be in a horizontal position and a dog 395, shown in FIG. 8, that is secured to the periphery of a collar portion 398 of the spindle head so as to move with the spindle head 26, engages a plunger 401 of a limit switch 399 to actuate the switch. With the switch 399 actuated, its associated contact bars 399–1 and 399–2 will be moved to closed and open positions respectively. Thus, a circuit is completed from an energize power line P1 through a conductor C1, a normally closed contact bar 406–1 of a deactuated switch 406, the now closed cotnact bar 399–1 of actuated switch 399, conductor C2 to a solenoid 582 associated with the valve 581. The circuit is completed from the solenoid 582 to a power line P2 via a connected conductor C3. With the solenoid 582 energized, it will effect the operation of a fluid valve 581 so that pressure fluid from a supply line 558 is directed into a line 588 and thence into a chamber 394 of the actuator 350. Pressure fluid supplied to the chamber 394 will move the cam member actuating piston 353 in a rightward direction, as viewed in FIG. 1, or leftward direction, as viewed in FIG. 8. The rightward movement of the piston 353 operates to rotate the cam member 340 180° relative to the inner ends of the spindles 35 and 36. With the cam member 340 rotated 180° from the position shown in FIG. 1, the lobe 361 ofthe cam 356 and the lobes 367 of the cams 357 and 358 will be moved out of engagement with the ends of the drawbars 333 and 332, respectively, that are associated with the spindle 26. This action will release the drawbars 333 and 332 so that they operate to effect operation of the gripping members carried by the spindle 36 to lock the tool 52 against axial displacement and operate the collet 331 to clamp the tool 52 in the spindle, respectively, as previously described. On the other hand, 180° rotation of the cam member 340 moves the cam lobes 361 and 367 into engagement with the inner ends of the drawbars 308 and 287, respectively, associated with the spindle 35, to effect the operation of the gripping members 263 and the collet 247, associated with the spindle 35, for releasing the tool 51.

As the spindle head continues to rotate another 90° in a complete 180° of indexing movement, the spindle 36 will be moved from the horizontal position to a downwardly facing vertical work operating position 74 with its associated tool 52 securely locked in the spindle. In like manner, the spindle 35 will be moved from the horizontal position into an upright vertical tool change position 75 but its associated tool 51 will now be released preparatory to a tool change operation. After the cam member 340 has been rotated relative to the spindle by operation of the piston 253 to effect the release of the tool 51 associated with the spindle 35 and to effect the locking and clamping of the tool 52 in the spindle 36, the cam memberp 340 will rotate bodily with the spindle head 26. Therefore, the cam member 340 will operate to maintain the drawbars 308 and 287, associated with the spindle 35, in an outer position so that the gripping members 263 and the collet 247 are released and the tool 51 is free to be removed from the spindle.

A similar control arrangement is provided for controling the operation of the cam member 340 in a second cycle of spindle head indexing movement wherein the spindle 35 is moved from an upwardly facing tool change position 75 to a downwardly facing work operating position 74 and the spindle 36 is moved from the operating position 74 to the tool change position 75. The operation of the spindle head 26 has been described above as being indexed 180° to locate the spindle 35 in the tool change position 75 and the spindle 36 in the operating position 74. As a result, as previously described, the cam member 340 is positioned so that the lobe 361 of the cam portion 356 and the lobes 367 of the cam portions 357 and 358 are in engagement with the inner ends of the drawbars 308 and 287, respectively, to release the tool in the spindle 35. In a second cycle of indexing movement, as the spindle head 26 is rotated, the cam member 340 and its associated drive shaft 341 and actuating piston 353 will rotate bodily with the spindle head 26 so that the cam member 340 remains in the same position relative to the inner end of the spindle 35. When the spindle head 26 is rotated 90° from the vertical position, wherein the spindle 35 is in a horizontal rightwardly facing direction, and the spindle 36 is in a horizontal leftwardly facing position, as viewed in FIG. 8, a limit switch 406 will be actuated. Actuation of the limit switch 406 is effected by a dog 407, shown in FIG. 8, secured on the periphery of the collar portion 398 of the spindle head 26 and located thereon diametrically opposite the dog 395, in a position wherein the spindle head 26 rotates in the second cycle of indexing movement, the dog 407 moves with it and is in position to engage the plunger 408 of the limit switch 406 when the spindle 35 has been rotated 90° toward the operating station or position 74.

Figure 8:
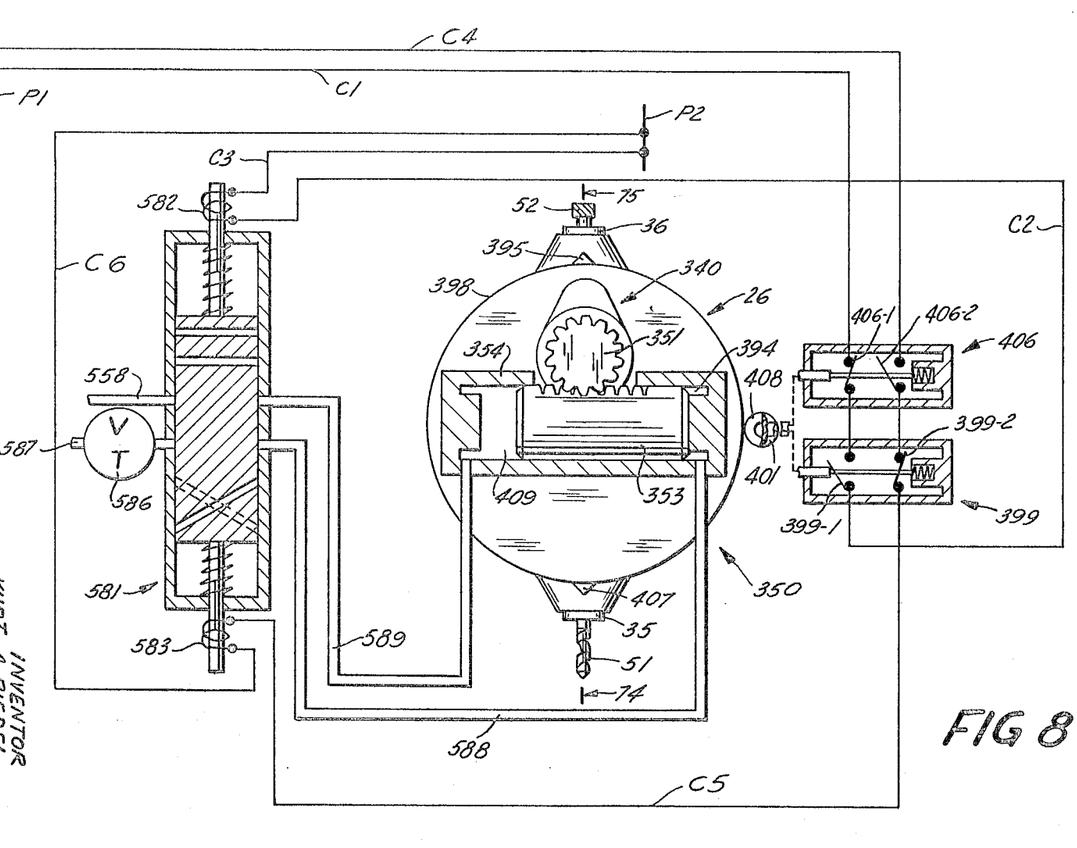

With the switch 406 actuated, its associated contact bars 406–1 and 406–2 are moved to open and closed positions respectively. Since the switch 399 is presently deactuated, its associated contact bars 399–1 and 399–2 will be biased to their normally open and closed positions respectively. Thus, with the switch 406 actuated so that its contact bar 406–2 is in a closed position, an energizing circuit is completed from the energized power line P1 through a conductor C4 the now closed contact bar 406–2 of the actuated switch 406 the now closed contact bar 399–2 of the deactuated switch 399, a conductor C5 to a solenoid 583 associated with the valve 581. The circuit is completed from the solenoid 583 to the power line P2 via a connecting conductor C6. With the solenoid 583 energized, the valve 581 will be actuated to direct pressure fluid from the supply line 558 into a connect line 589. The pressure fluid will flow from the line 589 into a chamber 409, shown in FIGS. 1 and 8, for moving the cam member actuating piston 353 in the opposite direction into the position it is shown in FIGS. 1 and 8. This movement of the piston 353 will effect rotation of the cam member 340 through 180° relative to the spindles 35 and 36. Such rotation of the cam member 340 results in positioning the lobes 361 and 367 to release the drawbars 308 and 287 associated with the spindle 35 to effect the locking and clamping of the tool carried by the spindle. However, the lobes 361 and 367 are moved into engagement with the ends of the drawbars 333 and 332, respectively, that are associated with the spindle 36 to effect a release of the tool carried by this spindle. As the spindle head 26 rotates another 90° to complete the 180° of index movement, the cam member 340 will also rotate bodily with the spindle head 26 to maintain the tool in the spindle 35 in locked and clamped condition.

The operation of the collets associated with the spindles 35 and 36 in conjunction with the modified form of the gripping members shown in FIGS. 6 and 7 are effected by means of a cam member 340A illustrated in FIG. 7. The cam member 340A is keyed to the shaft 341 for rotation therewith so that cam member 340A will be operatively driven by the piston 353 through the mechanism previously described for driving the cam member 340.

Cam member 340A, as shown in FIG. 7, is formed with a center cam 356A and a pair of larger cams 357A and 358A which are identical to the cams 357 and 358 previously described in conjunction with FIG. 5. Inasmuch as the cams 357A and 358A function as a single cam, only the cam 358A is shown in FIG. 7. The center cam 356A is generally of a circular configuration having a lobe 361A. The cam 356A has the same configuration as the cam 356 described in conjunction wtih FIG. 5. However, in the case of cam 356A, it is positioned on the shaft 341 180° from the position of the cam 356 on the shaft 341. Thus, the cam 356A is mounted on and keyed to the shaft 341 so that its cam lobe 361A is disposed in engagement with the extending inner end of the actuating shaft 308 associated with the spindle 35. Cam 357A is not shown in FIG. 7 but it has the same configuration as cam 358A which is illustrated therein. The cams 357A and 358A present cam lobes 367A which are disposed to engage the thrust bearing 368a of the draw-in bar 332 that is associated with the collet carried by the spindle 36. Thus, with the cam member 340A arranged as shown in FIG. 7, the lobe 361A of the cam 356A will operate to apply a force to the end 364 of the actuating rod 308 forcing it rightwardly, as viewed in FIG. 1, which, in turn, applies an outwardly acting force to the rod 425 that is associated with the modified gripping members 420, as shown in FIG. 6. This outwardly acting force applied to the rod 425 will move the rod axially to shift the gripping members 420 radially outwardly into gripping engagement with the surface 258 of the coupling 255, as previously described. At the same time, with the cam 358A disposed, as shown in FIG. 7, the peripheral surface of the cam member does not engage thrust bearing 368 associated with the drawbar 287 so that the spring 292 operates to move the drawbar 287 inwardly or leftwardly, as viewed in FIG. 1, thereby operating the collet 247 into clamping engagement with the tool therein. In like manner, the end 362 of the actuating rod 333 associated with the spindle 36 is not engaged by the peripheral surface of the cam 356A so that the spring 335 associated with the actuating rod 333 will operate to move the rod inwardly or rightwardly, as viewed in FIG. 1, its full limit of travel for pulling the rod 425 inwardly or rightwardly. As a result, the gripping members 420 associated with the spindle 36 are urged inwardly by operation of the springs 437 and plungers 436 so that the gripping members 420 are moved inwardly toward the axis of the spindle and downwardly for releasing the tool associated with the collet of the spindle 36. On the other hand, the cam lobe 367A of the cam 358A is disposed to engage the thrust bearing 368 associated with the drawbar 333 so that the cam 358A overcomes the pressure of the spring 335 and causes the draw-in bar to move axially in a leftward direction for releasing the collet associated with the spindle 36.

It is apparent, therefore, that the cams 357A and 358A operate in the same manner as do the cams 357 and 358 associated with the cam member 340. However, the cam 356A associated with the cam member 340A operates opposite to the operation of the cam 356 associated with the cam member 340 insofar as the cam lobe 361A of the cam 356A functions to apply a force to the actuating rods associated with the gripping members 420 for locking the gripping members while the cam lobe 361 of the cam 356 associated with the cam member 340 operates to apply a force to the actuating rods associated with the gripping members 263 to release the gripping members. On the other hand, when the cam lobe 361A of the cam 356A is positioned so as not to apply a force to the actuating rod 425 associated with the gripping members 420, these gripping members are moved to released positions. Conversely, when the cam lobe 361 of the cam 356 associated with the cam member 340 is positioned so as not to apply a force to the actuating rod 301 associated with the gripping members 263, the gripping members are moved into gripping engagement with the end of the tool.

A cycle of operation will be described in which a tool associated with the spindle 35 is assumed to be in the operating station and in clamped condition and the spindle 36 is in the tool change station with its tool released because the cam member 340A is in the position shown in FIG. 7. Therefore, as indexing of the spindle head 26 begins, the tool 52 associated with the spindle 36 is released and the tool 61 associated with the spindle 35 is locked against axial displacement as well as being clamped by the associated collet 247. When the spindle head 26 has been rotated 90° from the position shown in FIGS. 1 and 8, the spindle 36 will be positioned to extend horizontally in a rightward direction and the spindle 35 will be positioned to extend horizontally in a leftward direction. In this position of the spindle head 26, the dog 395, shown in FIG. 8, which moved with the spindle head, is positioned to engage the plunger of the limit switch 399 to actuate the switch for effecting rightward movement of the piston 353, as viewed in FIG. 1. Rightward movement of the piston 353 operates to rotate the cam member 340A 180° relative to the spindles 35 and 36. With the cam member 340A rotated 180° from the position shown in FIG. 7, the lobe 361A of the cam 356A will be moved out of engagement with the end of the actuating rdo 308 associated with the spindle 35 while the cam 367A associated with the cam 358A is moved into engagement with the end of the drawbar 287 associated with spindle 35. This action will release the actuating rod 308 so that the spring 292 operates to draw the actuating rod and the connected rod 425 inwardly to release the gripping members 420. On the other hand, when the cam lobe 367A of the cam member 358A is moved into enengagement with the end of the drawbar 287, it overcomes the force of the spring 313 to move the drawbar axially in a direction to release the collet 247 associated with the spindle 35. Therefore, the tool 51 associated with the spindle 35 is released.

On the other hand, the cam lobe 361A of the cam 356A is now positioned to engage the end of the actuating rod 333 so that it exerts a pressure on the rod to overcome the force of the spring 335 moving the actuating rod 425 outwardly thereby moving the gripping members 420 into tool gripping engagement for axially locking the tool in the spindle 36. In addition, the cam 358A is positioned so that its peripheral surface does not engage the adjacent end of the drawbar 332 so that the spring 334 operates to move the drawbar 368 inwardly to operate the collet associated with the spindle 36 in a clamping action. Thus, the tool associated with the spindle 36 is locked against outward movement by the gripping members 420 and is also clamped in the spindle by the collet associated with the spindle. With this condition obtained when the spindle head 26 is rotated another 90° so that the spindle 36 is in the operating station, its tool is securely locked in the spindle while the tool in the spindle 35, moving into the tool change station, will be released.

The axial locking and the clamping of a tool in one spindle and the simultaneous releasing of a tool in the opposite spindle is effected by means of the piston 353 that is axially movable within the cylinder 354, as previously described. It will be assumed that the spindle head 26, as depicted diagrammatically in FIG. 8, is being moved in an indexing movement in a clockwise direction of rotation so that the spindle 36, with a tool in a released condition therein, is moved out of the tool change position 75, and the spindle 35, with a tool axially locked and clamped therein, is moved out of the operating position 74. The piston and cylinder mechanism 350 for simultaneously clamping and releasing the tools carried in the spindles 35 and 36 is under the control of a directional valve 581 which normally prevents the flow of fluid pressure to and from the cylinder 354, as shown in FIG. 8, the valve 581 may be actuated in one or the other of two flow directing positions by energizing a solenoid coil 582 or a solenoid coil 583. Since the spindle 36 with a tool in a released condition therein is being moved out of the tool change position 75, the solenoid coil 582 will be energized to actuate the valve 581 to position the valve to connect the chamber 394 at the right end of the cylinder 354, as viewed in FIG. 8, to the pressure line 558 to move the piston 353 toward the left end of the cylinder 354. Such movement of the piston 353 toward the left end of the cylinder 354 operates to rotate the cam member 340 180° relative to the inner ends of the spindles 35 and 36, as previously described. The 180° rotation of the cam member 340 operates to release the drawbars 332 and 333 associated with the spindle 36, to effect axial locking and collet clamping of the tool carried in the spindle 36. The 180° rotation of the cam member 340 also operates to position the cam member in engagement with the inner ends of the drawbars 287 and 308 associated with the spindle 35, to move these drawbars axially outwardly so that the tool carried in the spindle 35 will be released for subsequent withdrawal from the spindle. On the other hand, in a second cycle of operation, the spindle 35, with a tool carried thereby in a released condition, will be moved from the tool change position 75 to the operating position 74 while the spindle 36, with a tool axially locked and clamped therein, will be moved out of the operating position 74 and into the tool change position 75. In this cycle of operation, the solenoid coil 583 is energized to actuate the valve for connecting the chamber 409 at the left end of the cylinder 354 to the pressure line 558 to move the piston 353 in a rightward direction into the position depicted in FIG. 8. The movement of the piston 353 toward the right end of the cylinder 354 operates to again rotate the cam member 340 180° relative to the inner ends of the spindles 35 and 36. However, this 180° rotation of the cam member 340 moves the cam member so as to release the drawbars 287 and 308 associated the spindle 35 to effect the axial locking and collet clamping of the tool carried by the spindle, while positioning the cam member in engagement with the inner ends of the drawbars 332 and 333 associated with the spindle 36 to move these drawbars axially outwardly for effecting a complete release of the tool carried by the spindle 36. A throttle valve 586 is connected in a return line 587 that carries exhaust pressure from the piston and cylinder mechanism 350 to a return line 588 so that the rate of rotation of the cam member 340 may be regulated.

When the spindle head 26 has been rotated substantially 90° from the position shown in FIG. 1, the limit switch 399 will be actuated by the dog 395 to move its contact bar 399–1 to a closed position and simultaneously moving its associated contact bar 399–2 to an open position. With the contact bar 399–1 moved to a closed position, a circuit will be completed and current will flow from the energized power line P1 through a normally closed contact bar 406–1 of the deactuated limit switch 406 and through the closed contact bar 399–1 of the actuated limit switch 399. The current will flow from the closed contact bar 399–1 to the solenoid coil 582 of the valve 581 and thence to the power line P2 to complete the circuit for energizing the solenoid coil 582. With the solenoid coil 582 energized, the valve 581 will be actuated to position the valve for directing fluid pressure to the chamber 394 at the right end of the cylinder 354, as viewed in FIG. 8, to operate the cam member actuating mechanism 350 for rotating the cam member 340 180° relative to the inner ends of the spindles 36 and 35, as previously described. This operation actuates the drawbars 332 and 333 associated with the spindle 36 to axially lock and clamp the tool carried by the spindle 36. In addition, the drawbars 287 and 308 associated with the spindle 35 are operated to release the tool carried by the spindle 35, as previously described. The dog 395, shown in FIG. 8, is positioned to maintain the limit switch 399 actuated as the spindle head 26 continues to be rotated until the piston 353 of the actuator 350 has moved its full limit of leftward travel, as viewed in FIG. 8.

As the spindle head 26 continues to move in its indexing movement, the dog 395 will be moved out of engagement with the plunger of the limit switch 399 thereby deactuating the limit switch and its contact bar 399–1 is moved to an open position and its associated contact bar 399–2 is moved to a closed position, as shown in FIG. 8. Moving the contact bar 399–1 to open position results in the circuit to the solenoid coil 582 of the valve 581 being interrupted to deenergize the coil. Thereupon, the valve is actuated to a position to block the flow of fluid pressure to the cam member actuator 350 and also to block the flow of exhaust pressure therefrom.

In the second cycle of tool change operation, the initial position of the spindle head 26 would be such that the spindle 35, with a tool therein in a released condition, is in the tool change position 75 and is to be moved to the operating position 74, while the spindle 36, with a tool locked therein, is in the operating position 74 and is to be positioned in the tool change position 75. Under these conditions, the operation of the electrical system previously described for the first cycle of a tool change operation will be the same. However, in the second cycle of tool change operation, when the spindle head 26 has been moved substantially 90° from the initial vertical position, the dog 407, shown in FIG. 8, will be moved into position to engage the plunger of the limit switch 406 to actuate the switch. The limit switch 406, upon being actuated, will move its associated normally closed contact bar 406–1 to an open position to insure that the solenoid coil 582 cannot be inadvertently energized. Simultaneously, with the movement of the contact bar 406–1 to an open position, an associated normally open contact bar 406–2 of the limit switch 406 is moved to a closed position. With the contact bar 406–2 moved to a closed position, a circuit will be completed and current will flow from the power line P1 through the closed contact bar 406–2 of the actuated limit switch 406 and through the normally closed contact bar 399–2 of the deactuated limit switch 399. From the contact bar 399–2, current will flow through the solenoid coil 583 of the valve 581 to the power line P2 to complete the circuit to energize the coil 583. With the solenoid coil 583 energized, the valve 581 will be actuated to a position to direct pressure fluid to the chamber 409 of the cam member actuator 350 for rotating the cam member 340 180° relative to the inner ends of the spindles 35 and 36. In this second cycle operation of the cam member 340, it will operate to effect the operation of the drawbars 287 and 308 associated with the spindle 35 to axially lock and clamp the tool carried therein in the spindle. The rotation of the cam member 340 in the second cycle of operation will also effect the operation of the drawbars 332 and 333 associated with the spindle 36 for releasing the tool carried by the spindle 36, as previously described. The dog 407, which actuates the limit switch 406, is arranged to maintain the limit switch 406 actuated for an interval of time sufficient to insure that the piston 353 of the actuator is moved its full limit of travel in the opposite direction. As the spindle head 26 continues to move in its second cycle of indexing movement, the dog 407 will be moved out of engagement with the plunger of the limit switch 406 and the limit switch will be released and deactuated. Upon deactuation of the limit switch 406, its contact bar 406–2 is moved to its normally open position to interrupt the circuit to the solenoid coil 583 to deenergize the coil. With the solenoid coil 583 deenergized, the valve 581 is actuated to a position to block the flow of fluid pressure to the cam member actuator 350 and also to block the flow of exhaust pressure from the actuator 350.

From the foregoing detailed description of the illustrative embodiment set forth herein to exemplify the present invention, it will be apparent that there has been provided an improved spindle chuck device which is automatically operable to grip a tool to lock the tool to the spindle so that the tool rotates with the spindle and also engages with the tool to apply an axial inwardly acting force on the tool to urge the tool inwardly into the spindle into full seated engagement in the spindle and also to prevent tool "pull-out" during a machining operation.

Although the illustrative embodiment of the invention has been described in considerable detail for the purpose of disclosing a practical operative structure whereby the invention may be practiced advantageously, it is to be understood that the apparatus described is intended to be illustrative only and that the novel characteristics of the invention may be incorporated in other structural forms without departing from the spirit and scope of the invention, as defined in the subjoined claims.

The principles of this invention having now been fully explained in connection with the foregoing description, I hereby claim as my invention:

1. In a machine tool having a tool operator provided with an axial opening;

a collet having an axial opening for receiving a tool means and disposed in the opening of said tool operator for securing the tool means to said tool operator;

a first machine controlled power actuated means for pulling a tool means into said collet to position and hold said tool means in axial position in said collet; and, a second machine controlled power actuated means for pulling said collet inwardly into the opening of said tool operator into radial gripping engagement with said tool means.

2. A machine tool according to claim 1 wherein said first and second machine controlled power actuated means each include a spring and a cam for counteracting the operation of an associated spring.

3. A machine tool according to claim 2 wherein said first machined controlled power actuated means includes outwardly extending gripping fingers constructed and arranged to enter into and grip an internal surface of an undercut recess formed in the inwardly extending end of said tool means.

4. A machine tool according to claim 1 wherein said collet is provided with a plurality of axially extending radial deflectable resilient elements;

and there is provided means cooperating between said tool operators and said collet for deflecting and releasing said resilient members into and out of holding engagement with a tool means upon relative axial movement between said tool operator and said collet;

and said power actuated means for pulling said collet into the opening of said tool operator comprises a plurality of slidable gripping members having means to engage and grip a projection provided on the tool means to prevent axial movement of the tool means relative to the tool operator;

first means operable upon sliding movement of said gripping members to cause the means on said gripping members to engage and grip the projection on the tool means;

second means operable to effect relative axial movement between said tool operator and said collet in one direction to effect radial deflection of said collet resilient elements into holding engagement with a tool means; and, third means operable to move said slidable gripping members in the same direction, whereby said first means will operate to cause the means on said gripping members to engage and grip the projection on the tool means thereby locking the tool means against axial displacement relative to said collet.

5. In a machine tool according to claim 1 wherein said tool operator is a cylindrical spindle rotatably supported in the machine tool and provided with a central opening extending through said spindle from end to end;

said collet being constructed and arranged within one end of the spindle opening and being also provided with a central opening extending therethrough from end to end, the outer end of the opening in said collet being constructed and arranged to receive a tool;

contractible tool gripper members operably disposed in the inner end of the opening in said collet and disposed to engage a gripping surface provided on a tool carried within the opening provided in said collet;

an actuator for said tool gripper members also disposed in the inner end of the opening in said collet;

coaxially arranged first and second drawbars supported in said spindle for rotation therewith and for axial movement relative to said spindle and to each other, said drawbars extending into the opening of said collet at the inner end thereof, said first drawbar being connected to effect axial movement of said collet relative to said spindle and the second drawbar being connected to operate said actuator for said tool gripper members;

a pair of springs encircling said drawbars, one being associated with said first drawbar and the other being associated with said second drawbar, said springs being normally operable to urge their associated drawbars in directions wherein the associated tool gripper members and collet are actuated in a tool clamping and locking operation;

means associated with each of drawbars to move them in a direction in opposition to the normal operating characteristic on the associated spring; and individual means operably associated with each drawbar to effect the movement of the associated drawbar in a direction opposite to the direction in which the associated spring urges the drawbar, whereby said collet and said gripper actuator may be operated to move said collet and said tool gripper members in a tool clamping and releasing operation.

6. In a collet for a tool operator having an axial opening;

a collet body receivable in the front opening of the tool operator and having an axial bore adapted to receive a tool means therein at its front end;

an external surface formed on said collet body and adapted to cooperate with the internal wall surface of the opening in said tool operator in which said collet body is receivable;

a support seated in the rearward part of the axial bore of said collet body and including actuating means; and, a plurality of gripper members movably mounted in said support for movement relative to said support, said gripper members being operably connected to be operated by said actuating means to grip a tool means disposed within the bore of said collet body for restraining the tool means from axial movement therein.

7. A collet according to claim 6 wherein the axial bore in said collet body extends through the rear end of said collet body;

and there is provided a drawbar having its forward end extending into the bore of said collet body from the rear end thereof, said drawbar being provided with an axial bore;

securing means to releasably secure said drawbar to said collet body; and, there is also provided a secondary bar disposed to extend through the bore in said drawbar into the axial bore in said collet body for controlling said actuating means for moving said gripper members into gripping engagement with said tool means.

8. A collet according to claim 6 wherein said actuating means includes inclined guides;

and the tool means is provided with an internal gripipng surface; and, said gripper members include slidable fingers supported in said inclined guides, said fingers being constructed and arranged to enter into and expand radially outwardly by operation of said inclined guides to engage the gripping surface provided in the tool means.

9. A collet according to claim 8 wherein the tool means receivable in said collet body includes a shank adapted to enter the bore provided in the collet body, and the terminal rear end of said shank is provided with an undercut recess operably constructed to receive said slidable fingers in axial locking engagement therewith.

10. A collet according to claim 8 wherein said secondary bar includes a frusto-conical head; and, said gripper members are provided with inclined surfaces adapted to be engaged by the conical surface of said frusto-conical head upon axial movement of said secondary bar in one direction to thereby move said fingers into gripping engagement with said tool means.

11. A collet according to claim 8 wherein said secondary bar includes a chisel end; and, said gripper members are provided with inclined surfaces adapted to be engaged by the chisel end of said secondary bar upon axial movement of said secondary bar in one direction to thereby move said fingers into gripping engagement with said tool means.

No references cited.

WILLIAM W. DYER, JR., *Primary Examiner.*

G. A. DOST, *Assistant Examiner.*